UNITED STATES PATENT OFFICE.

BERTHOLD FEDERER, OF SCHMARSE, GERMANY, ASSIGNOR TO CHEMISCHE FABRIK VORM. GOLDENBERG, GEROMONT & CIE., OF WINKEL-ON-THE-RHINE, GERMANY.

MANUFACTURE AND PRODUCTION OF BAKING-POWDER.

980,936. Specification of Letters Patent. Patented Jan. 10, 1911.

No Drawing. Application filed December 16, 1909. Serial No. 533,331.

*To all whom it may concern:*

Be it known that I, BERTHOLD FEDERER, a subject of the Emperor of Austria-Hungary, and resident of Schmarse, Silesia, Germany, have invented certain new and useful Improvements in the Manufacture and Production of Baking-Powder, of which the following is a specification.

For the manufacture of baking powder, the difficultly soluble acid potassium tartrate has been mainly used together with acid sodium carbonate; the use of the said acid potassium tartrate is however costly, because only one half of the tartaric acid enters into the reaction. It has, therefore, been attempted to use tartaric acid itself for making baking powders, rendering the acid more difficultly soluble by coating it with a protective covering. This coating was obtained by stirring and mixing the tartaric acid or the bicarbonate, or both substances, with the protective covering in a molten condition, and mixing the baking powder with these substances which solidified on cooling. For coating the chemicals, large amounts of the molten substances *i. e.* about 10 per cent. were necessary. According to another proposal the coating was effected by mixing the tartaric acid with ethereal and fatty oils in alcoholic solution, so that after the solvent had been evaporated, a layer of oil remained on the tartaric acid. This layer of oil however prevented the baking powder thus produced possessing the requisite pulverulent form, as it acquired a fatty, unctuous consistency.

The object of the present invention is to treat the acid constituents of the baking powder, such, for instance, as tartaric acid, citric acid, or other suitable acid, or salts thereof, or the carbonate constituent, or both active constituents of the baking powder with substances dissolved in a suitable solvent, which are also solid at ordinary temperatures, but become liquid at a higher temperature. Substances of this kind are hydrocarbons, fatty acids, waxes, including beeswax and vegetable wax, spermaceti, and other like substances. After the solvent has been evaporated in a suitable apparatus, there remains on the product to be coated, a thin layer of the solid impregnating material, such as is often found in nature as a protective layer on plants and fruits. As this layer is quite uniformly distributed on the product to be coated and consists of a solid substance, the penetration of water at ordinary temperature is rendered practically impossible.

As an example, 4 parts of wax are dissolved in 40 parts of ligroin, one half of this solution is mixed with 75 parts of pulverized tartaric acid and the other half with 84 parts sodium bicarbonate. When the solvent has been evaporated in a vacuum apparatus, the impregnated chemicals are sifted and mixed together with from 100, to 150, parts of starch powder.

In order to prevent the action of the baking powder taking place too violently at the moment the coating melts, coatings melting at different temperatures may be used. Thus, for instance, one portion of tartaric acid may be coated with stearic acid and another portion with wax and the products be mixed. As the melting point of stearin is higher than that of wax, the portion coated with stearin becomes active later than does the portion coated with wax, thus permitting the reaction to take place in a very advantageous manner.

Having now particularly described and ascertained the nature of my said invention, and in what manner the same is to be performed, I declare that what I claim is:—

1. The process of making baking powder, comprising treating an active constituent with a substance, which is solid at ordinary temperatures but melts at higher temperatures, dissolved in a volatile solvent so as to leave when evaporated a solid coating on the active substance.

2. The process of making baking powder, comprising treating an active constituent with wax, dissolved in a volatile solvent so as to leave when evaporated a solid coating on the active substance.

3. The process of making baking powder, comprising coating different portions of an active constituent with substances which melt at different temperatures.

4. A baking powder containing an active constituent different portions of which are coated with substances which melt at different temperatures.

In testimony whereof I have signed my name to this specification in the presence of two subscribing witnesses.

BERTHOLD FEDERER.

Witnesses:
ERNST KATZ,
ERNST B. HIRSCH.